US006822375B2

(12) United States Patent
Mori et al.

(10) Patent No.: US 6,822,375 B2
(45) Date of Patent: Nov. 23, 2004

(54) VIBRATING GYROSCOPE AND ELECTRONIC DEVICE USING THE SAME HAVING A DRIVING CIRCUIT, A DETECTION CIRCUIT AND FOUR SUPPORTING MEMBERS WITH DIFFERENT RIGIDITIES, DIFFERENT SHAPES, DIFFERENT CROSS SECTIONS, DIFFERENT MATERIALS AND DIFFERENT LENGTHS

(75) Inventors: Akira Mori, Omihacihiman (JP); Isao Toyoshima, Kurita-gun (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 09/792,193

(22) Filed: Feb. 22, 2001

(65) Prior Publication Data

US 2001/0015594 A1 Aug. 23, 2001

(30) Foreign Application Priority Data

Feb. 23, 2000 (JP) ........................................ 2000-045866

(51) Int. Cl.[7] ........................ H01L 41/06; H01L 41/04; H01L 41/18; H02H 2/00
(52) U.S. Cl. .................. 310/351; 310/366; 310/316.01; 310/352
(58) Field of Search .............................. 310/351, 366, 310/316.01, 352; 333/329, 189; 73/504.02, 504.12, 504.14, 504.16

(56) References Cited

U.S. PATENT DOCUMENTS

| 3,831,043 | A | * | 8/1974 | Hoffmann et al. .......... 310/352 |
| 3,906,249 | A | * | 9/1975 | Gibert et al. ............... 310/352 |
| 4,104,553 | A | * | 8/1978 | Engdahl et al. ............. 310/352 |
| 4,139,793 | A | * | 2/1979 | Michel ....................... 310/353 |
| 4,366,361 | A | * | 12/1982 | Allen ....................... 219/78.01 |
| 4,550,475 | A | * | 11/1985 | Ishigami et al. ........... 29/25.35 |
| 4,742,182 | A | * | 5/1988 | Fuchs ........................ 174/52.4 |
| 5,256,929 | A | * | 10/1993 | Terajima .................... 310/326 |
| 5,428,995 | A | * | 7/1995 | Fersht et al. ................. 73/504 |
| 5,430,342 | A | * | 7/1995 | Watson ....................... 310/316 |
| 5,434,365 | A | * | 7/1995 | Mori et al. ................. 174/262 |
| 5,635,786 | A | * | 6/1997 | Fujimoto et al. ........... 310/316 |
| 5,693,998 | A | * | 12/1997 | Fujimoto et al. ........... 310/366 |
| 5,837,895 | A | * | 11/1998 | Fujimoto ................. 73/504.12 |
| 6,023,973 | A | * | 2/2000 | Yabe et al. .............. 73/504.12 |
| 6,058,777 | A | * | 5/2000 | Fujimoto et al. ........ 73/504.12 |
| 6,089,087 | A | * | 7/2000 | Fujimoto et al. ........ 73/504.12 |
| 6,116,086 | A | * | 9/2000 | Fujimoto ................. 73/504.14 |
| 6,145,177 | A | * | 11/2000 | Fujimoto ................... 29/25.35 |
| 6,201,341 | B1 | * | 3/2001 | Fujimoto ................... 310/367 |
| 2001/0013251 | A1 | * | 2/2001 | Fujimoto ................. 73/504.04 |

FOREIGN PATENT DOCUMENTS

| JP | 9-269227 | 10/1997 |
| JP | 10-062179 | 3/1998 |
| JP | 2000337884 A | * 12/2000 |

* cited by examiner

Primary Examiner—Burton S. Mullins
Assistant Examiner—Julio Gonzalez
(74) Attorney, Agent, or Firm—Keating & Bennett, LLP

(57) ABSTRACT

A vibrating gyroscope includes a vibrator having a longitudinal direction and being capable of vibrating in a bending mode in a bending direction perpendicular to the longitudinal direction. The vibrator has first and second nodes which elongate in a direction perpendicular to both the bending direction and the longitudinal direction and first, second, third and fourth supporting members connected to the vibrator such that the first node is interposed between the first and second supporting members and the second node is interposed between the third and fourth supporting members. The first node is located at the vicinity of either the first supporting member or the second supporting member, and the second node is located at the vicinity of either the third supporting member or the fourth supporting member.

13 Claims, 11 Drawing Sheets

CAMERA SHAKE          MOVEMENT OF OPTICAL SYSTEM

VIBRATING GYROSCOPE AND ELECTRONIC DEVICE USING THE SAME HAVING A DRIVING CIRCUIT, A DETECTION CIRCUIT AND FOUR SUPPORTING MEMBERS WITH DIFFERENT RIGIDITIES, DIFFERENT SHAPES, DIFFERENT CROSS SECTIONS, DIFFERENT MATERIALS AND DIFFERENT LENGTHS

BACKGROUND OF THE INVENTION

1. Field of the Invention

The present invention relates to a vibrating gyroscope and an electronic device using the same, and more specifically, it relates to a vibrating gyroscope for use in video cameras having an anti-camera-shake function, car navigating systems, pointing devices, and the like, and an electronic device using the same.

2. Description of the Related Art

FIG. 11 is a perspective view of a vibrating gyroscope comprising a vibrator 50, and FIGS. 12A–12C show a plan view, a front view, and a bottom view, respectively, thereof. The vibrating gyroscope shown in FIGS. 11 and 12A–12C is disclosed in Japanese Unexamined Patent Application Publication No. 11-125526.

In FIG. 11, the vibrator 50 includes a first piezoelectric substrate 101 having one principal plane on which a first strip electrode is formed on the top surface and which is polarized in the thickness direction; and a second piezoelectric substrate 102 having one principal plane on which a second strip electrode is formed on its bottom surface and which is polarized in the thickness direction. The other principal plane of the first piezoelectric substrate 101 and the other principal plane of the second piezoelectric substrate 102 are bonded via an intermediate electrode 103.

The first strip electrode has a dividing slot S0 extending in the longitudinal direction thereof, and dividing slots S1 and S2 that are formed widthwise of the first strip electrode to be slightly closer in the longitudinal direction to the center than the positions to which nodes N1 and N2 are vertically projected on the first strip electrode. Hence, the first strip electrode is divided into electrode parts 104 and 105 by the dividing slot S0, and the electrode parts 104 and 105 are further divided into the electrode parts 104a, 104b, 104c, 105a, 105b, and 105c by the dividing slots S1 and S2. The second strip electrode is composed of an electrode part 106a.

Supporting members 107a and 107b which also function as leads are disposed at positions to which the nodes N1 and N2 of the vibrator 50 are projected on the first strip electrode; and supporting members 507c and 507d which also function as leads are disposed at positions to which the nodes N1 and N2 are projected on the second strip electrode. A technique such as soldering is used to connect the supporting member 107a to the electrode parts 105a, 104b, and 105b; the supporting member 107b to the electrode parts 104a, 104c, and 105c; and the supporting members 507c and 505d to the electrode part 106a. The supporting members 107a, 107b, 507c, and 507d are made of the same material, are configured in the same form, and have the same rigidity.

By fixing the ends of the supporting members 107a, 107b, 507c, and 507d, and by applying drive signals to the electrode part 106a serving as a drive electrode via the supporting members 507c and 507d, the vibrator 50 having such a structure undergoes flexural vibration in the thickness direction with free longitudinal ends, where the nodes for the lowest order mode are the nodes N1 and N2. Since the first piezoelectric substrate 101 and the second piezoelectric substrate 102 are held by the supporting members 107a, 107b, 507c, and 507d having the same rigidity, the nodes N1 and N2 are formed substantially at the middle between the first strip electrode and the second strip electrode in the thickness direction.

The conventional vibrating gyroscopes have a problem in that there exists a deviation in the vibrating characteristic of the vibrator between respective vibrating gyroscopes produced by the same production method. In addition, the vibrating characteristic of each vibrating gyroscope shifts differently in response to the change in the ambient temperature and over time.

SUMMARY OF THE INVENTION

It is therefore an object of the present invention to reduce the deviation in the vibrating characteristic of the vibrator between respective vibrating gyroscopes and realize a vibrating gyroscope which can detect an angular velocity precisely.

The foregoing and other objects are achieved in accordance with certain features of the invention by a vibrating gyroscope which comprises a vibrator having a longitudinal direction and being capable of vibrating in a bending mode in a bending direction perpendicular to the longitudinal direction. The vibrator has first and second nodes which elongate in a direction perpendicular to both the bending direction and the longitudinal direction and first, second, third and fourth supporting member connected to the vibrator such that the first node is interposed between the first and second supporting members and the second node is interposed between the third and fourth supporting members. The first node is located at the vicinity of either the first supporting member or the second supporting member, and the second supporting member is located at the vicinity of either third supporting member or the fourth supporting member.

It is preferable that the first supporting member and the second supporting member have the different rigidities, and the third supporting member and fourth supporting member have the different rigidities. To this end, the first supporting member and the second supporting member may have different shapes from each other or have different cross sections from each other. The first supporting member and the second supporting member may also be made of different materials.

According to a vibrator of the present invention, supporting members having different rigidities are located at positions to which nodes are projected on a first strip electrode and a second strip electrode. Hence, the nodes are displaced toward either the first strip electrode or the second strip electrode with respect to the thickness direction. Therefore, there is less variation in the nodes of the vibrator with respect to the thickness direction, and there is less variation in the driving balance of the vibrator, thus providing an accurate determination of angular velocity.

A vibrating gyroscope according to the present invention is less affected by disturbances or changes over time because the driving balance of a vibrator is maintained for stable vibration, thus providing an accurate determination of angular velocity.

An electronic device according to the present invention incorporates a vibrating gyroscope capable of accurately determining an angular velocity, thus forming a precise control mechanism.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

BRIEF DESCRIPTION OF THE DRAWING(S)

DETAILED DESCRIPTION OF PREFERRED EMBODIMENTS

The inventors of the present invention have found that the deviation in the vibrating characteristics is due to a positional deviation of the node points of the vibrator in the vibrating gyroscope, and that the positional deviation of the nodes is caused by variation in rigidity of the supporting members among the respective vibrating gyroscopes. Further, it has been found that the rigidity of the supporting members changes over time due to the fact that the contact state between the vibrator and the supporting member varies. This is caused by the change over time in the state of a solder or an adhesive material which connects the vibrator to the supporting member.

The above-explained positional deviation of the node points may be small. However, as the conventional vibrating gyroscope is required to have node points at a center of the thickness direction of the vibrator, even such a small positional deviation of the node points in the thickness direction result in off center of the node points, thereby causing a large change in vibrating characteristics.

In view of the aforementioned reasons, the inventors have found that it is beneficial that the vibrator is designed to have node points which are off center. As a result of further study, it is found that, if the node point is positioned at the vicinity of the supporting member, the small positional deviation or shift of the node points does not affect vibrating characteristics substantially, and the vibrating characteristics are stable regardless of the above-explained factors.

Hereinafter, preferred embodiments will be explained in detail with reference to the drawings.

Figure 1:
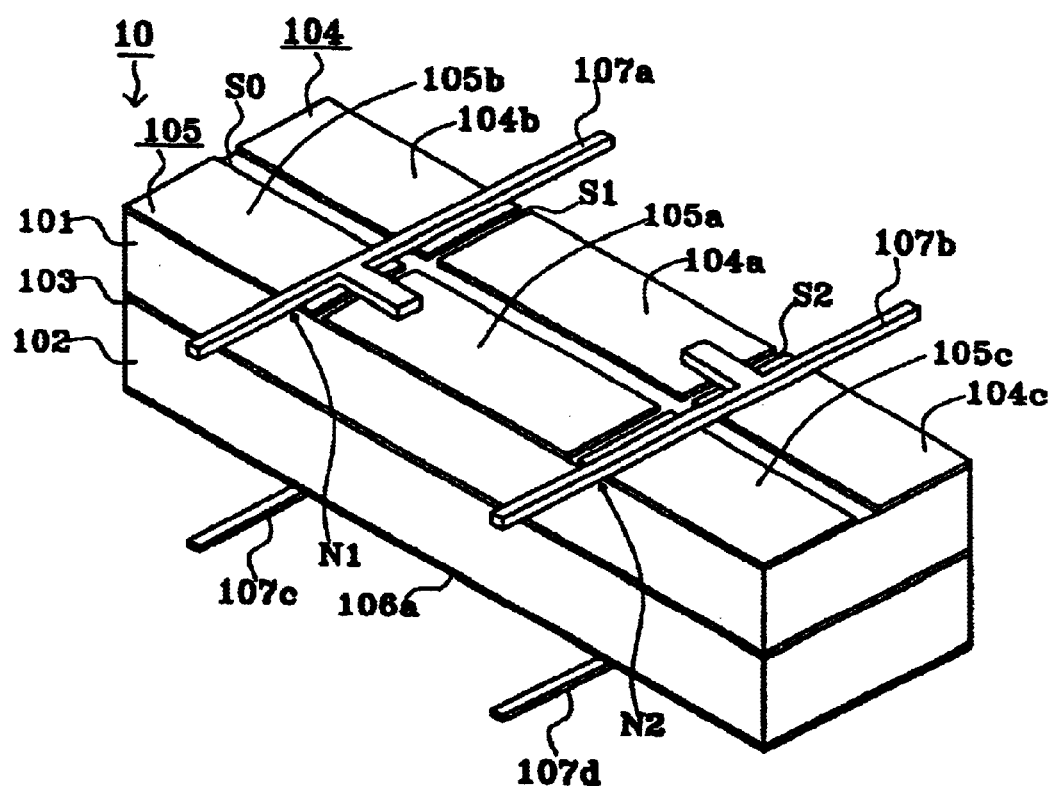
FIG. 1 is a perspective view of a vibrating gyroscope according to an embodiment of the present invention.
Figure 2A:
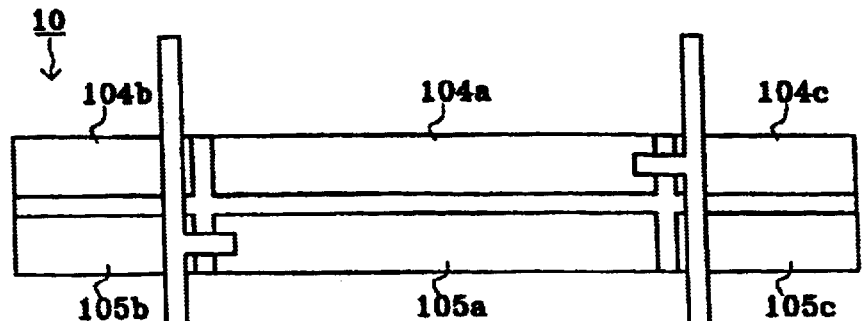
FIGS. 2A to 2C are a plan view, a front view and a bottom view of the vibrating gyroscope shown in FIG. 1, respectively.
Figure 2B:
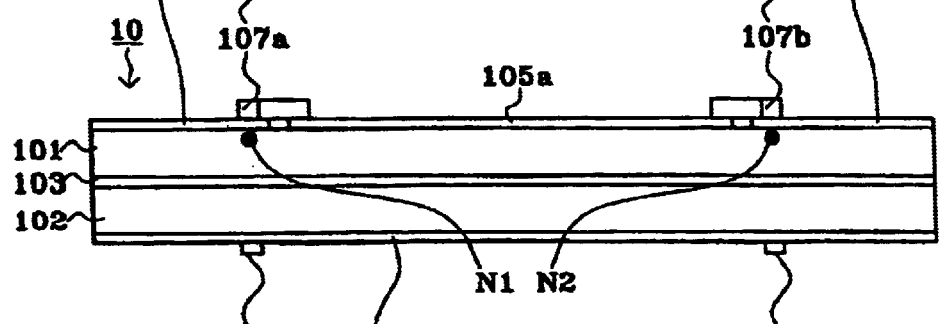
Figure 2C:
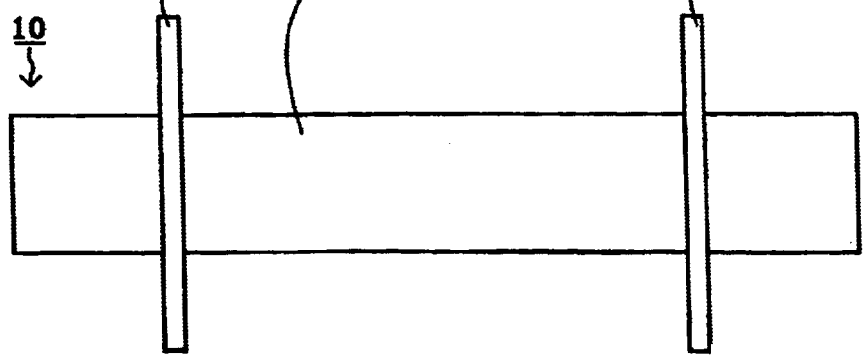

In FIG. 1, there is shown a perspective view of an embodiment of a vibrating gyroscope according to the present invention, and in FIGS. 2A–2C, there are shown a plan view, a front view, and a bottom view, respectively, thereof. In FIGS. 1 and 2A–2C, the same reference numerals are assigned to the same or like components as those in the vibrator 50 shown in FIGS. 11 and 12A–12C, and thus descriptions thereof are omitted.

In FIG. 1, the vibrating gyroscope comprises a vibrator 10 and support members 107a to 107d. The vibrator 10 has a longitudinal direction and vibrates in a bending mode in a bending direction perpendicular to the longitudinal direction. The bending vibration of the vibrator 10 creates nodes N1 and N2 each of which elongates in a direction perpendicular to both the bending direction and the longitudinal direction in the vibrator 10. The vibrator 10 is provided with the supporting members 107c and 107d instead of the supporting members 507c and 507d of the conventional vibrator 50. The supporting members 107c and 107d have smaller cross-sectional areas than the supporting members 107a and 107b, and have lower rigidities for supporting members. Here, the position of the node N1 of the vibrator 10 migrates toward one of the supporting member 107a on the first strip electrode and the supporting member 107c on the second strip electrode, which has higher rigidity. Hence, the position of the node N1 is displaced to the vicinity of the supporting member 107a having higher rigidity. Similarly, the position of the node N2 of the vibrator 10 is displaced to the vicinity of the supporting member 107b.

It is preferable that the supporting members 107a and 107b have higher rigidity than the supporting member 107c and 107d such that the nodes N1 and N2 are positioned in the thickness direction at one fourth or less from the outer surfaces of the vibrator 10.

The vibrator 10 having such a structure provides less variation in position of the nodes N1 and N2 from product to product, as well as reduces the amount of migration of the nodes N1 and N2 in the thickness direction due to changes over time, because the nodes N1 and N2 are displaced to the vicinity of the supporting members 107a and 107b.

When the supporting members 107a and 107b have sufficiently greater rigidities than the supporting members 107c and 107d, the nodes N1 and N2 are located at the surface of the vibrator 10 and in contact with the supporting members 107a and 107b. Thus, the position of the nodes N1 and N2 does not vary from product to product, and thus changes over time do not cause the nodes N1 and N2 to migrate in the thickness direction.

Conversely, if the cross-sectional areas of the supporting members 107c and 107d are made larger than those of the supporting members 107a and 107b to bring the nodes N1 and N2 into the vicinity of the supporting members 107c and 107d, the same advantages are obtained.

Figure 3A:
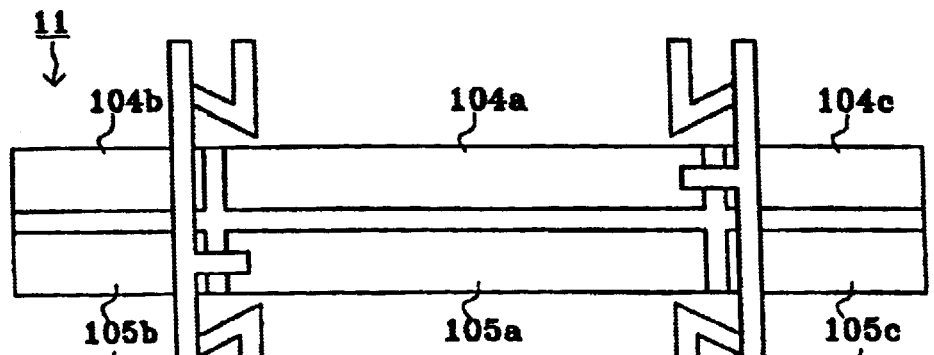
FIGS. 3A to 3C are respectively a plan view, a front view and a bottom view of a vibrating gyroscope according to another embodiment of the present invention.
Figure 3B:
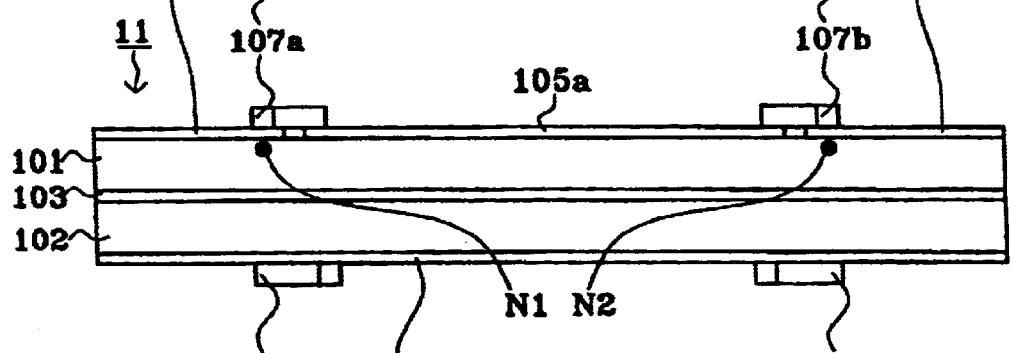
Figure 3C:
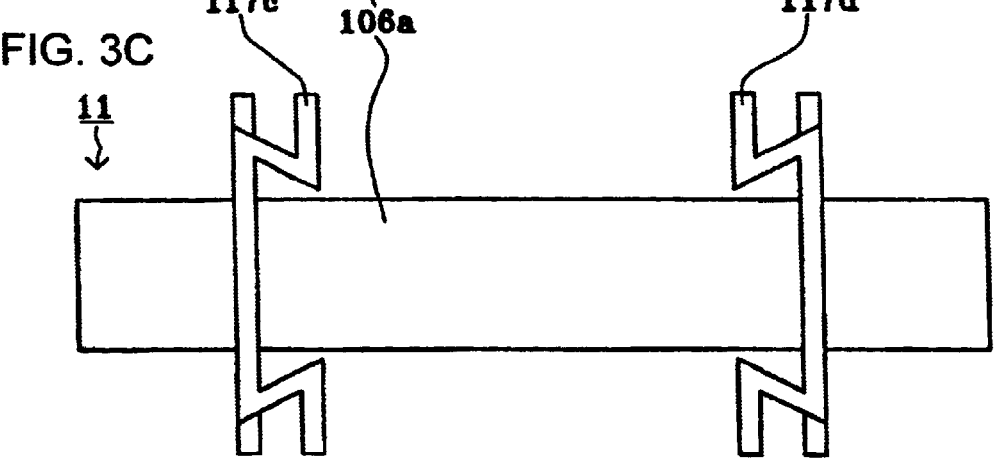

Next, in FIGS. 3A–3C, there are shown a plan view, a front view, and a bottom view, respectively, of another embodiment of the vibrating gyroscope according to the present invention. In FIGS. 3A–3C, the same reference numerals are assigned to the same or like components as those in the vibrator 10 shown in FIGS. 1 and 2A–2C, and therefore descriptions thereof are omitted.

In FIGS. 3A–3C, supporting members 117c and 117d are used in the vibrator 11 instead of the supporting members 107c and 107d in the vibrator 10. The supporting members 117c and 117d have the same cross-sectional areas as the supporting members 107c and 107d, but have different shapes therefrom. While the supporting members 107a and 107b are each configured so as to have the center portion connected to the first strip electrode, and have ends extending straight widthwise of the vibrator 11, the supporting members 117c and 117d are each configured so as to have the center portion connected to the second strip electrode, and have ends extend widthwise of the vibrator 11 as Z-shaped portions. For this reason, the supporting members 117c and 117d have lower rigidities as supporting members than the supporting members 107a and 107b. Therefore, in the same manner as the vibrator 10 shown in FIGS. 1 and 2A–2C, the position of the node N1 of the vibrator 11 is displaced to the vicinity of the supporting member 107a having higher rigidity, and the position of the node N2 is displaced to the vicinity of the supporting member 107b. The vibrator 11 having such a structure also has the same advantages as those of the vibrator 10 shown in FIGS. 1 and 2A–2C.

The shapes of the supporting members 107a, 107b, 117c and 117d are not limited to the shapes shown in FIGS. 3A–3C. Additionally, a shape may be used so that the supporting members 117c and 117d have higher rigidities than the supporting members 107a and 107b. Also, by making the cross-sectional areas of the supporting members 117c and 117d different from those of the supporting members 107a and 107b, the rigidities of the supporting members 117c and 117d may thus be different from that of the supporting members 107a and 107b.

Figure 4A:
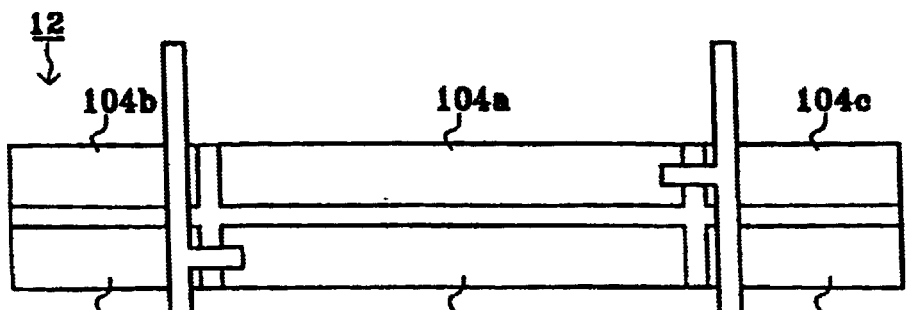
FIGS. 4A to 4C are respectively a plan view, a front view and a bottom view of a vibrating gyroscope according to still another embodiment of the present invention.
Figure 4B:
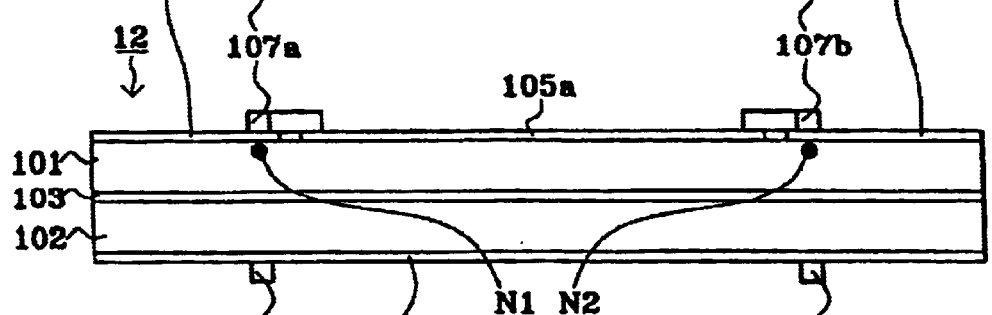
Figure 4C:
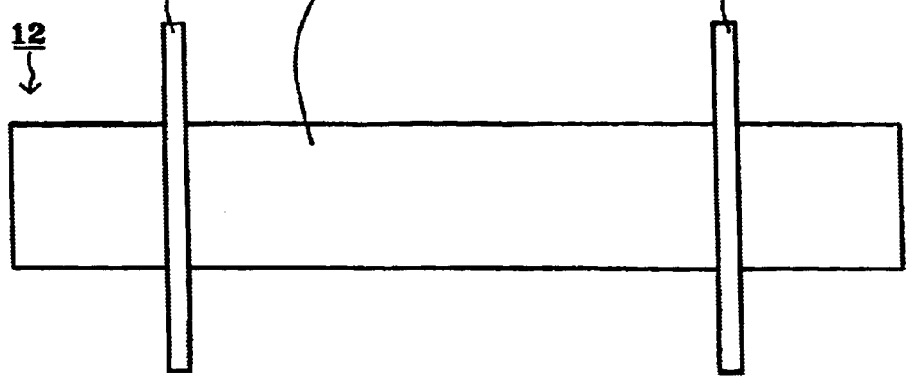

Next, in FIGS. 4A–4C, there are shown a plan view, a front view, and a bottom view, respectively, of still another embodiment of the vibrating gyroscope comprising vibrator 12 according to the present invention. In FIGS. 4A–4C, the same reference numerals are assigned to the same or like components as those in the vibrator 10 shown in FIGS. 1 and 2A–2C, and therefore descriptions thereof are omitted.

In FIGS. 4A–4C, the vibrator 12 is provided with supporting members 127c and 127d instead of the supporting members 107c and 107d in the vibrator 10. The supporting members 127c and 127d have the same cross-sectional area and the same shape as the supporting members 107c and 107d, but are made of different materials. Here, provided that the supporting members 107a and 107b are made of molybdenum, which is a high elasticity material while the supporting members 127c and 127d are made of copper which is a low elasticity material, the supporting members 107a and 107b have higher rigidities for supporting members than the supporting members 127c and 127d. Therefore, the position of the node N1 of the vibrator 12 is displaced to the vicinity of the supporting member 107a having higher rigidity, and the position of the node N2 is moved to the vicinity of the supporting member 107b. The vibrator 12 having such a structure also has the same advantages as those of the vibrator 10 shown in FIGS. 1 and 2.

It will be noted that the material contained in the supporting members 107a, 107b, 127c and 127d is not limited to the pairing of copper and molybdenum. Additionally, materials may be used such that the supporting members 127c and 127d have higher rigidities than the supporting members 107a and 107b. Also, by making the cross-sectional areas and shapes of the supporting members 127c and 127d different from those of the supporting members 107a and 107b, the rigidities of the supporting members 127c and 127d may thus be different from those of the supporting members 107a and 107b.

Figure 5:
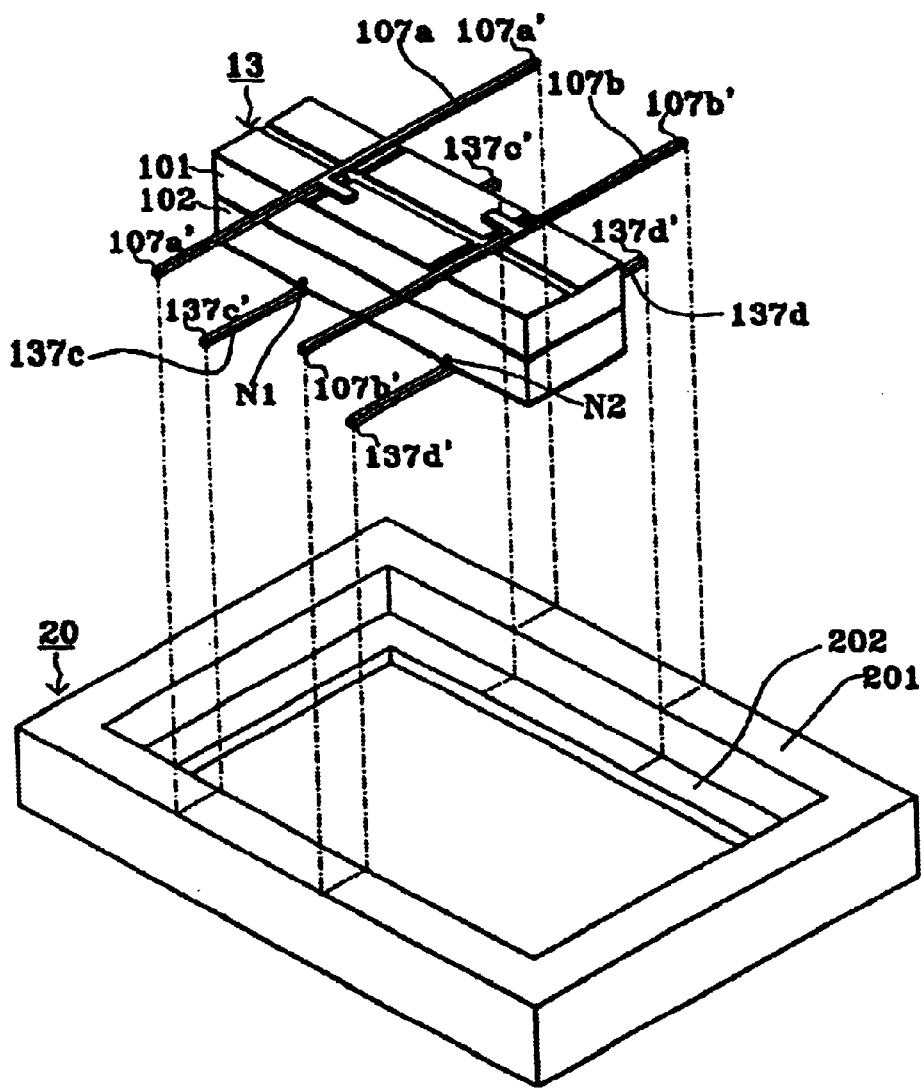
FIG. 5 is a perspective view of still another embodiment of the vibrating gyroscope according to the present invention.

Next, in FIG. 5, there is shown a perspective view of still another embodiment of the vibrating gyroscope according to the present invention. In FIG. 5, the same reference numerals are assigned to the same or like components as those in the vibrator 10 shown in FIGS. 1 and 2A–2C, and therefore descriptions thereof are omitted.

In FIG. 5, a vibrator 13 is provided with supporting members 137c and 137d, which are shorter than the supporting members 107a and 107b, in place of the supporting members 107c and 107d in the vibrator 10.

FIG. 5 also illustrates a frame 20 which is omitted in FIGS. 1 to 4. The frame 20 is a frame made of metal, resin, or the like, and has an outer periphery 201 and an inner periphery 202 in stepped relation. The outer periphery 201 is a portion on which the ends of the supporting members 107a and 107b are mounted, and the inner periphery 202 is a portion on which the ends of the supporting members 137c and 137d are mounted. The vibrator 13 is then fixed to the outer periphery 201 at support points 107a' and 107b' which form the ends of the supporting members 107a and 107b, and is fixed to the inner periphery 202 at support points 137c' and 137d' which form the ends of the supporting members 137c and 137d.

In this way, in the vibrator 13, the distances from the first strip electrode to the support points 107a' and 107b' are greater than the distances from the second strip electrode to the support points 137c' and 137d'. Hence, the supporting members 107a and 107b have lower rigidities for supporting members than the supporting members 137c and 137d. Therefore, the position of the node N1 of the vibrator 13 is displaced to the vicinity of the supporting member 137c having greater rigidity. Similarly, the position of the node N2 of the vibrator 13 is displaced to the vicinity of the supporting member 137d. The vibrator 13 having such a structure also has the same advantages as those of the vibrator 10 shown in FIGS. 1 and 2.

Alternatively, the distances from the first strip electrode to the support points 107a' and 107b' may be shorter than the distances from the second strip electrode to the support points 137c' and 137d'. Also, by making the cross-sectional areas, shapes, and materials of the supporting members 137c and 137d different from those of the supporting members 107a and 107b, the rigidities of the supporting members 137c and 137d may thus be different from those of the supporting members 107a and 107b.

Figure 6A:
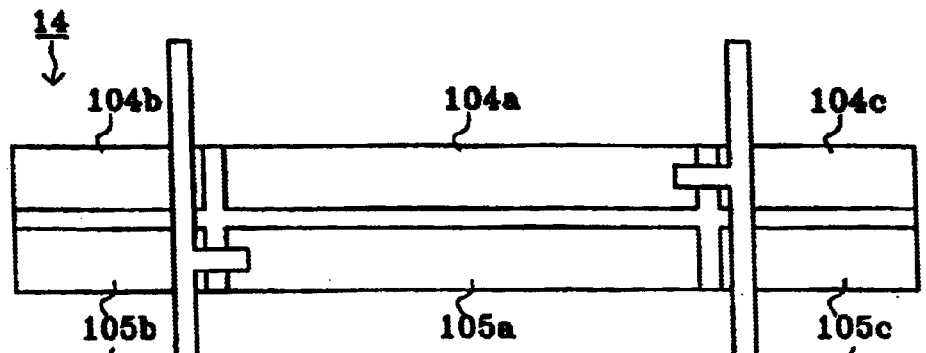
FIGS. 6A to 6C are respectively a plan view, a front view and a bottom view of a vibrating gyroscope according to still another embodiment of the present invention.
Figure 6B:
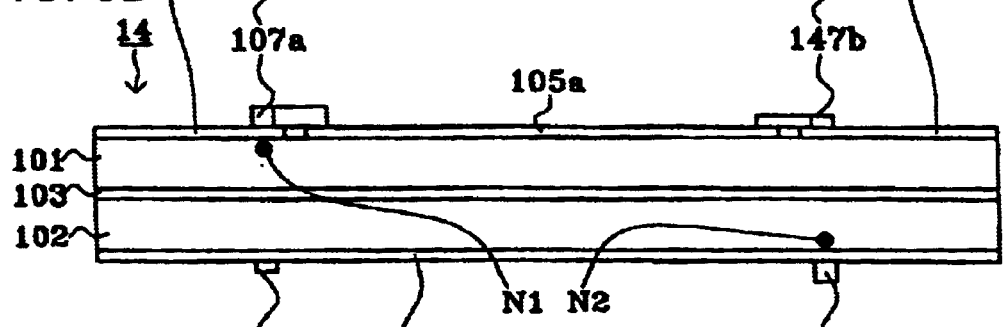
Figure 6C:
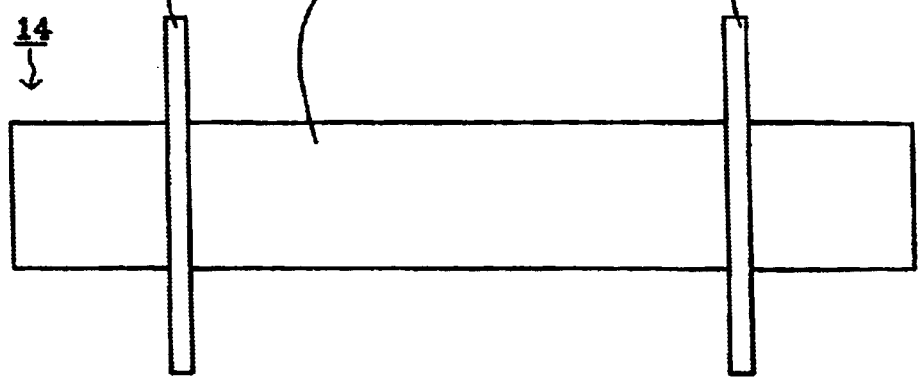

Next, in FIGS. 6A–6C, there are shown a plan view, a front view, and a bottom view, respectively, of still another embodiment of the vibrating gyroscope according to the present invention. In FIGS. 6A–6C, the same reference numerals are assigned to the same or like components as those in the vibrator 10 shown in FIGS. 1 and 2A–2C, and therefore descriptions thereof are omitted.

In FIGS. 6A–6C, a vibrator 14 is provided with supporting members 147b and 147d in place of the supporting members 107b and 107d in the vibrator 10. The supporting members 147b and 107c are different in cross-sectional area from the supporting members 107a and 147d. The supporting members 147b and 107c have smaller cross-sectional areas than the supporting members 107a and 147d, and thus have lower rigidities for supporting members. Therefore, the position of the node N1 of the vibrator 14 is displaced to the vicinity of the supporting member 107a having greater rigidity. Similarly, the position of the node N2 of the vibrator 14 is displaced to the vicinity of the supporting member 147d. The vibrator 14 having such a structure also has the same advantages as those of the vibrator 10 shown in FIGS. 1 and 2A–2C.

The vibrator 14 having such a structure does not have variations in position of the nodes N1 and N2 from product to product, nor do changes over time cause the nodes N1 and N2 to migrate in the thickness direction, because the nodes N1 and N2 are displaced to the vicinity of the supporting members 107a and 147d. Alternatively, the supporting members 147b and 107c may have larger cross-sectional areas than the supporting members 107a and 147d. Also, by making the cross-sectional areas, shapes, materials, and distances to the support points of the supporting members 107a, 147b, 107c and 147d different, the rigidities of the supporting members 147b and 107c may thus be different from those of the supporting members 107a and 147d.

Figure 7A:
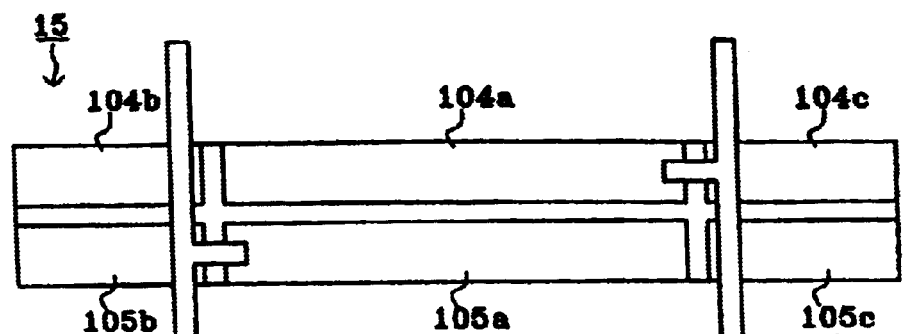
FIGS. 7A to 7C are respectively a plan view, a front view and a bottom view of a vibrating gyroscope according to still another embodiment of the present invention.
Figure 7B:
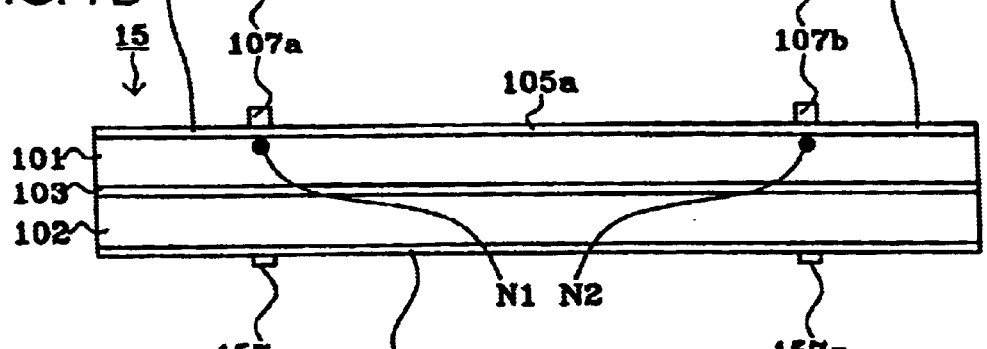
Figure 7C:
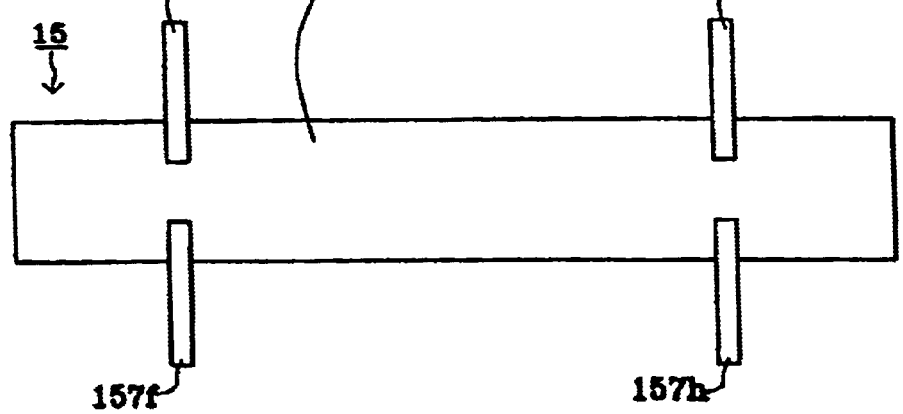

Next, in FIGS. 7A–7C, there are shown a plan view, a front view, and a bottom view, respectively, of still another embodiment of the vibrating gyroscope according to the present invention. In FIGS. 7A–7C, the same reference numerals are assigned to the same or like components as those in the vibrator 10 shown in FIGS. 1 and 2A–2C, and therefore descriptions thereof are omitted.

In FIGS. 7A–7C, a vibrator 15 is provided with supporting members 157e and 157f in place of the supporting member 107c in the vibrator 10, and supporting members 157g and 157h in place of the supporting member 107d. The supporting members 157e and 157f, and 157g and 157h are symmetrically aligned widthwise of the second piezoelectric substrate 102, each having one end connected to the second strip electrode, and the other end extending straight widthwise of the second piezoelectric substrate 102.

The respective cross-sectional areas of the supporting members 157e, 157f, 157g, and 157h are different from that of the supporting members 107a and 107b. The supporting members 157e, 157f, 157g, and 157h have smaller respective cross-sectional areas than the supporting members 107a and 107b, and have lower rigidities as supporting members. Therefore, the position of the node N1 of the vibrator 15 is displaced to the vicinity of the supporting member 107a having higher rigidity. Similarly, the position of the node N2 of the vibrator 15 is displaced to the vicinity of the supporting member 107b. The vibrator 15 having such a structure also has the same advantages as those of the vibrator 10 shown in FIGS. 1 and 2A–2C. It will be noted that alternatively the first strip electrode may be supported by four supporting members in the same manner as the supporting members 157e, 157f, 157g, and 157h on the second strip electrode.

In the above embodiments, a vibrating gyroscope has been described in which supporting members at the positions to which the node N1 is projected on the first strip electrode and the second strip electrode have different rigidities, and in which supporting members at the positions to which the node N2 is projected on the first strip electrode and the second strip electrode have different rigidities. Alternatively, the rigidities of the supporting members at the positions to which one of the node N1 and the node N2 is projected on the first strip electrode and the second strip electrode may be different, and the rigidities of the supporting members provided at the positions to which the other node is projected on the first strip electrode and the second strip electrode may be the same.

Figure 8:
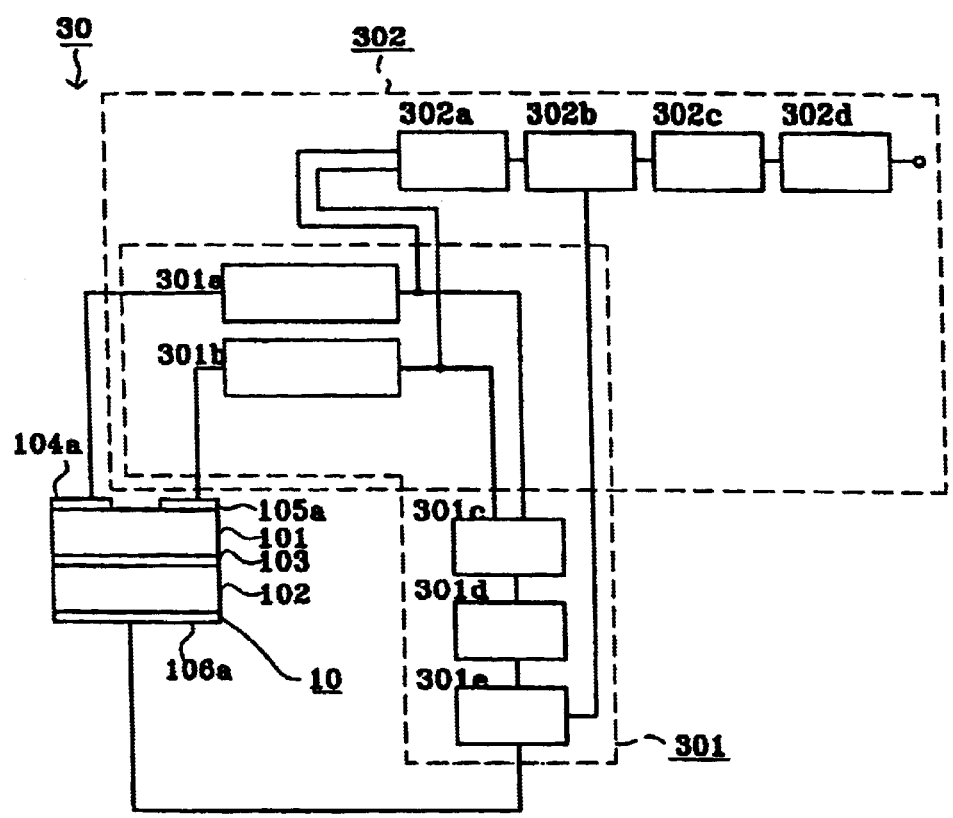
FIG. 8 is a block diagram showing the vibrating gyroscope according to still another embodiment of the present invention.

Next, in FIG. 8, there is shown a block diagram of an embodiment of a vibrating gyroscope using a vibrator in accordance with the present invention.

In FIG. 8, a vibrating gyroscope 30 of the present invention includes the vibrator 10 of the present invention shown in FIG. 1, an oscillating circuit 301 serving as driving means, and a detector circuit 302 serving as detecting means. The oscillating circuit 301 contains a first charge amp 301a, a second charge amp 301b, an adder circuit 301c, an AGC circuit 301d, and a phase correcting circuit 301e. The detector circuit 302 includes the first charge amp 301a, the second charge amp 301b, a differential circuit 302a, a detector circuit 302b, a smoothing circuit 302c, and an amplifier circuit 302d.

Here, the electrode part 104a which is a first detecting electrode of the vibrator 10 is connected to the first charge amp 301a, and the electrode part 105a which is a second detecting electrode of the vibrator 10 is connected to the second charge amp 301b. The first charge amp 301a and the second charge amp 301b are each connected to the adder circuit 301c and the differential circuit 302a. The adder circuit 301c is connected to the AGC circuit 301d; the AGC circuit 301d is connected to the phase correcting circuit 301e; and the phase correcting circuit 301e is connected to the detector circuit 302b and to the electrode part 106a serving as a driving electrode. The differential circuit 302a is connected to the detector circuit 302b; the detector circuit 302b is connected to the smoothing circuit 302c; and the smoothing circuit 302c is connected to the amplifier circuit 302d.

In the vibrating gyroscope 30 of the present invention having such a structure, the first charge amp 301a transforms an electric charge generated by the electrode part 104a serving as the first detecting electrode into a voltage for outputting to the adder circuit 301c and the differential circuit 302a. The second charge amp 301b transforms an electric charge generated by the electrode part 105a serving as the second detecting electrode into a voltage for outputting to the adder circuit 301c and the differential circuit 302a. The adder circuit 301c adds the input signals, and outputs them to the AGC circuit 301d; the AGC circuit 301d performs an amplification so that the input signals have constant amplitude, and outputs them to the phase correcting circuit 301 e; and the phase correcting circuit 301e performs a phase correction on the input signals, and applies drive signals to the electrode part 106a serving as the drive electrode.

On the other hand, the differential circuit 302a subtracts the input signals, and outputs the resulting signals to the detector circuit 302b; the detector circuit 302b detects the signals input from the differential circuit 302a with the signals input from the phase correcting circuit 301e, and outputs them to the smoothing circuit 302c; the smoothing circuit 302c smoothes the input signals, and outputs them to the amplifier circuit 302d; and the amplifier circuit 302d DC-amplifies the input signals, and outputs them to the outside.

In the vibrating gyroscope 30 having such a structure, by applying the drive signals to the electrode part 106a serving as the drive electrode, the vibrator 10 undergoes flexural vibration in the thickness direction with free longitudinal ends, where the nodes for the lowest order mode are the nodes N1 and N2. When an angular velocity having an axis in the longitudinal direction is applied to the vibrator 10, bending displacement occurs widthwise due to the Coriolis force, so that the angular velocity can be detected from the difference in signals between the electrode part 104a serving as the first detecting electrode, and the electrode 105a serving as the second detecting electrode. Furthermore, the signals corresponding to the bending displacement in the direction of thickness of the vibrator 10, which are not affected by the Coriolis force, can be detected from the sum of the signals of the electrode part 104a serving as the first detecting electrode, and those of the electrode part 105a serving as the second detecting electrode.

Since use of the vibrator 10 of the present invention allows the driving balance of the vibrator 10 to be maintained for stable vibration, the effects of disturbances or changes over time are reduced, providing an accurate determination of angular velocity.

Figure 9:
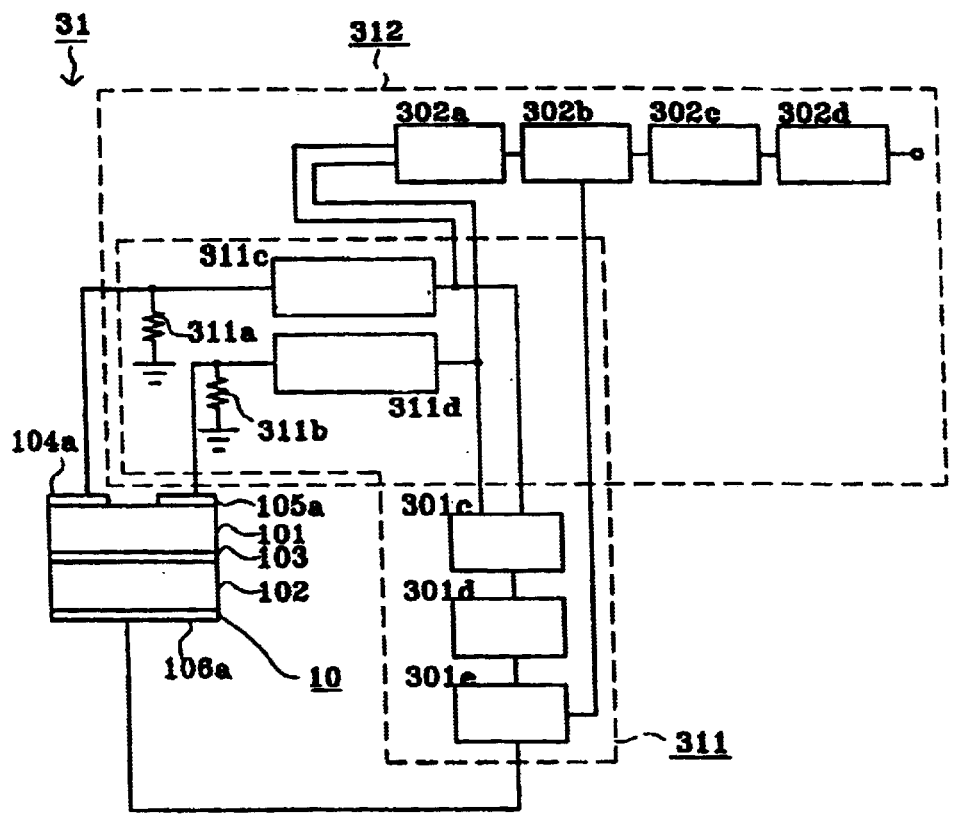
FIG. 9 is a block diagram showing the vibrating gyroscope according to still another embodiment of the present invention.

Next, in FIG. 9, there is shown another embodiment of the vibrating gyroscope using the vibrator of the present invention. In FIG. 9, the same reference numerals are assigned to the same or like components as those of the vibrating gyroscope 30 shown in FIG. 8, and therefore descriptions thereof are omitted.

In FIG. 9, an oscillating circuit 311 and a detector circuit 312 in a vibrating gyroscope 31 of the present invention are different from the oscillating circuit 301 and the detector circuit 302 in the vibrating gyroscope 30 shown in FIG. 8 in that resistors 311a and 311b, a first buffer circuit 311c, and a second buffer circuit 311d are provided in place of the first charge amp 301a and the second charge amp 301b.

In the vibrating gyroscope 31, accordingly, the resistor 311a and the first buffer circuit 311c are connected to the electrode part 104a serving as the first detecting electrode, and the resistor 311b and the second buffer circuit 31 Id are connected to the electrode part 105a serving as the second detecting electrode. The first buffer circuit 311c and the second buffer circuit 311d are connected to the adder circuit 301c and to the differential circuit 302a. Here, the first buffer circuit 311c outputs a voltage of the electrode part 104a serving as the first detecting electrode to the adder circuit 301c and to the differential circuit 302a; the second buffer circuit 311d outputs a voltage of the electrode part 105a serving as the second detecting electrode to the adder circuit 301c and to the differential circuit 302a; and the resistors 311a and 311b adjust impedance of the electrode part 104a serving as the first detecting electrode, and that of the electrode part 105a serving as the second detecting electrode.

Use of the vibrating gyroscope 31 having such a structure also provides the same advantages as those of the vibrating gyroscope 30 shown in FIG. 8.

Figure 10:
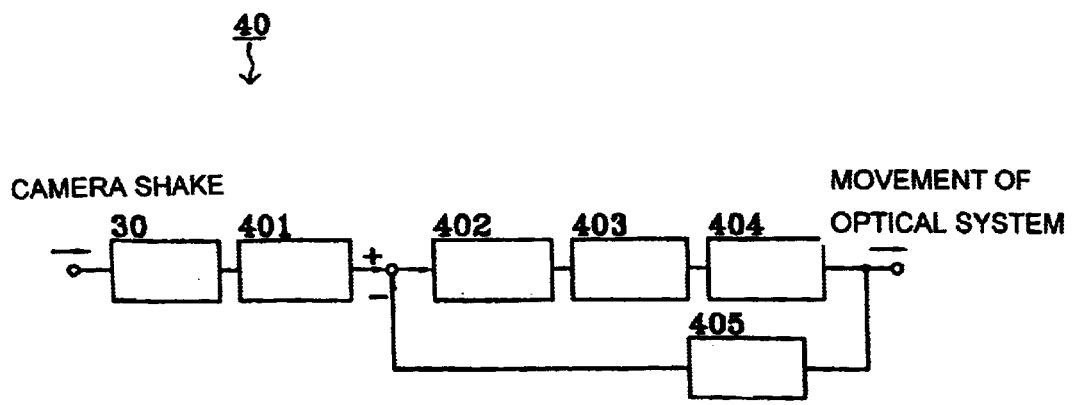
FIG. 10 is a block diagram showing an embodiment of an anti-camera-shake circuit employed in an electronic device according to the present invention.
Figure 11:
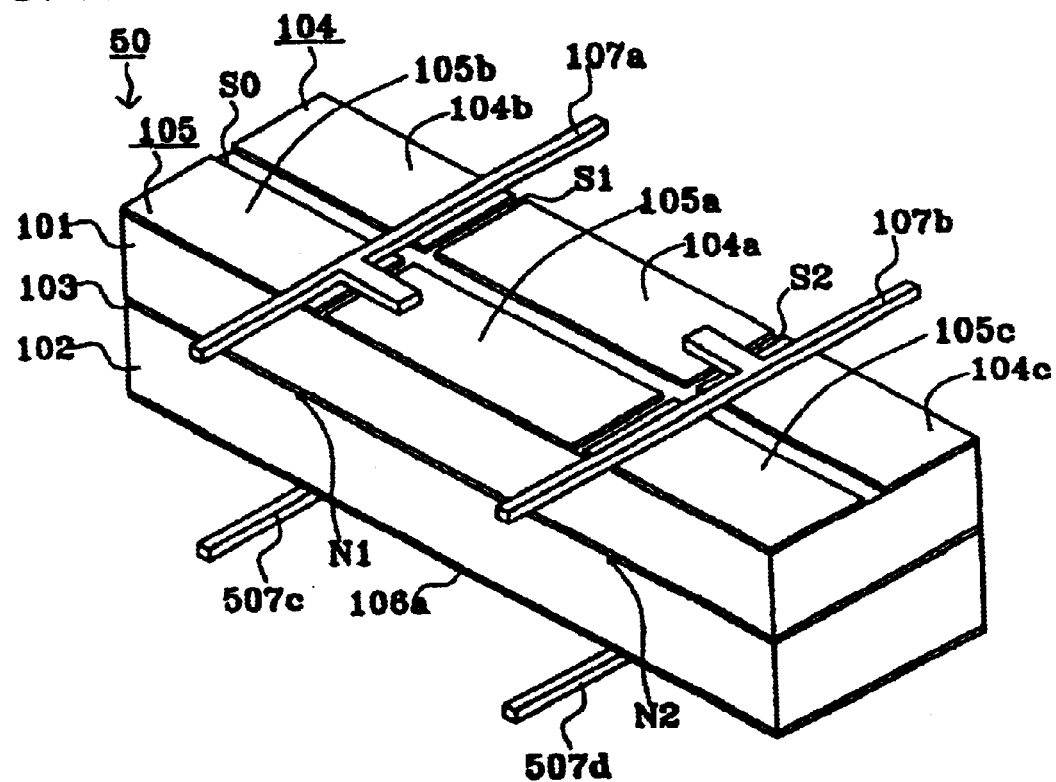
FIG. 11 is a perspective view of a vibrating gyroscope according to a conventional art.
Figure 12A:
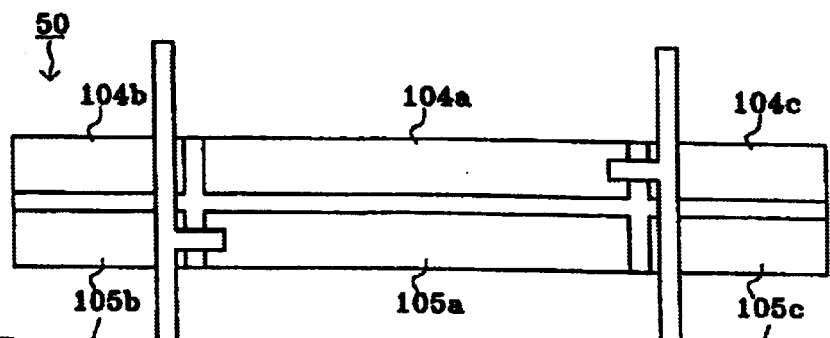
FIGS. 12A to 12C are respectively a plan view, a front view and a bottom view of a vibrating gyroscope shown in FIG. 11.
Figure 12B:
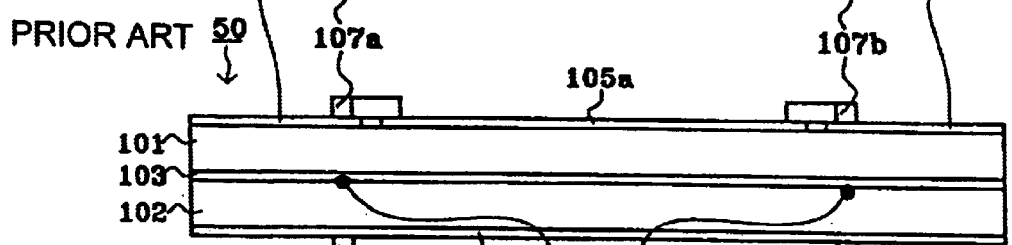
Figure 12C:
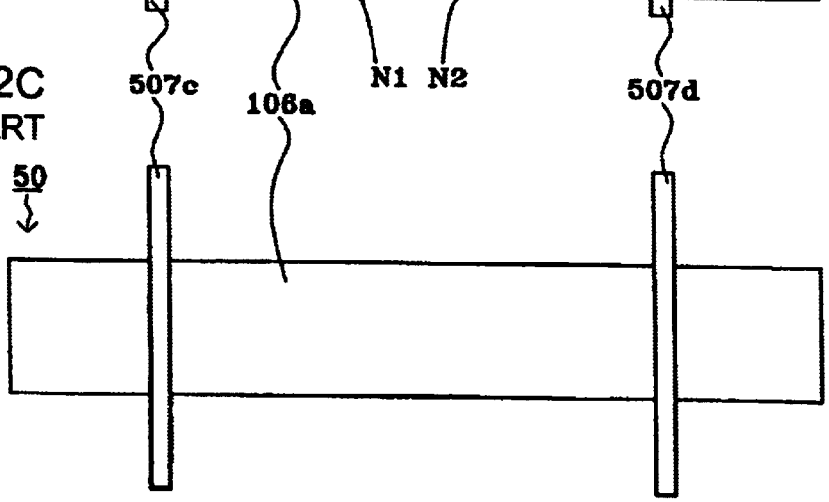

Next, in FIG. 10, there is shown an embodiment of an electronic device incorporating a vibrating gyroscope of the present invention. FIG. 10 is a block diagram showing an embodiment of an anti-camera-shake circuit for use in video cameras embodying an electronic device of the present invention. An anti-camera-shake circuit 40 includes the vibrating gyroscope 30 of the present invention, an integrator circuit 401, a servo circuit 402, an electric current driver 403, an actuator 404, and a position-sensing sensor 405. In the anti-camera-shake circuit 40, the vibrating gyroscope 20, the integrator circuit 401, the servo circuit 402, the electric current driver 403, and the actuator 404 are connected in series, and the output of the actuator 404 is fed back to the servo circuit 402 through the position-sensing sensor 405.

In the anti-camera-shake circuit 40 having such a structure, only signals of angular velocity of camera-shaking impaired to a video camera are input to the integrator circuit 401 from the vibrating gyroscope 30; the integrator circuit 401 integrates the angular velocity signals for conversion to angle of deviation in the video camera before outputting to the servo circuit 402; the servo circuit 402 uses the signals of the angle of deviation, which are input from the integrator circuit 401 and from the position-sensing sensor 405, to calculate the difference between the current value and the desired value, and outputs the result to the electric current driver 403; the electric current driver 403 outputs to the actuator 404 the current corresponding to the input signal; and the actuator 404 mechanically drives an optical system in the video camera. In turn, the position-sensing sensor 405 outputs to the servo circuit 402 the angle of deviation due to the driven optical system.

A video camera incorporating the anti-camera-shake circuit 40 having such a structure employs the vibrating gyroscope 30 capable of accurately determining an angular velocity, thus appropriately eliminating the effects of the camera-shaking impaired to the video camera.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A vibrating gyroscope comprising:

a vibrator having a length direction, a width direction and a thickness direction and being capable of vibrating in a bending mode in a bending direction perpendicular to the length direction, the vibrator having therein first and second nodes which extend in the width direction; and first, second, third and fourth supporting members connected to the vibrator such that the first node is interposed between the first and second supporting members and the second node is interposed between the third and fourth supporting members, wherein the first, second, third and fourth supporting members are configured such that the first node is located closer to one of the first and second supporting members than to the other of the first and second supporting members, and the second node is closer to one of the third and fourth supporting members than to the other of the third and fourth supporting members.

2. A vibrating gyroscope according to claim 1, wherein the first supporting member and the second supporting member have different rigidities, and the third supporting member and fourth supporting member have different rigidities.

3. A vibrating gyroscope according to claim 2, wherein the first supporting member and the second supporting member have different shapes from each other.

4. A vibrating gyroscope according to claim 3, wherein the third member and the fourth supporting member have different shapes from each other.

5. A vibrating gyroscope according to claim 2, wherein the first supporting member and the second supporting member have different cross sections from each other.

6. A vibrating gyroscope according to claim 5, wherein the third supporting member and the fourth supporting member have different cross sections from each other.

7. A vibrating gyroscope according to claim 2, wherein the first supporting member and the second supporting member are made of different materials from each other.

8. A vibrating gyroscope according to claim 7, wherein the third supporting member and the fourth supporting member are made of different materials from each other.

9. A vibrating gyroscope according to claim 2, wherein the first supporting member and the second supporting member have respective lengths extending from the vibrator in the width direction, the respective lengths being different.

10. A vibrating gyroscope according to claim 9, wherein the third supporting member and the fourth supporting member have respective lengths extending from the vibrator in a width direction, the respective lengths being different.

11. A vibrating gyroscope according to claim 1, further comprising a driving circuit for vibrating the vibrator and a detection circuit for detecting a signal output from the vibrator.

12. A vibrating gyroscope comprising:

a vibrator having a center axis and being capable of vibrating in a bending mode in a bending direction perpendicular to the center axis, the vibrator having therein first end second nodes; and first, second, third and fourth supporting members connected to the vibrator and structured and arranged such that the first node is interposed between the first and second supporting members and the second node is interposed between the third and fourth supporting members, the first node is located off the center axis at the vicinity of either the first supporting member or the second supporting member, and the second node is located off the center axis at the vicinity of either the third supporting member or the fourth supporting member.

13. A vibrating gyroscope comprising:

a vibrator having a longitudinal direction and being capable of vibrating in a bending mode in a bending direction perpendicular to the longitudinal direction;

opposing first and second supporting members connected respectively to opposing surfaces of the vibrator, the first and second supporting members having different rigidities; and opposing third and fourth supporting members connected respectively to the opposing surfaces of the vibrator, the third and fourth supporting members having different rigidities.

\* \* \* \* \*